United States Patent
Grinberg et al.

(10) Patent No.: US 6,276,431 B1
(45) Date of Patent: Aug. 21, 2001

(54) METHOD OF MAKING A SPRAY FORMED RAPID TOOL

(75) Inventors: Grigoriy Grinberg, Sylvania, OH (US); David Robert Collins, Southgate, MI (US); Jeffrey Alan Kinane, Birmingham, MI (US); Rick Thomas Heaman, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/515,733

(22) Filed: Feb. 29, 2000

(51) Int. Cl.⁷ .............................. B22D 23/00; B22D 19/00
(52) U.S. Cl. ................................................. 164/46; 164/98
(58) Field of Search .................. 164/46, 98, 516, 164/34

(56) References Cited

U.S. PATENT DOCUMENTS

| 5,155,321 | 10/1992 | Grube et al. . |
| 5,352,405 | 10/1994 | Beaman et al. . |
| 5,430,666 | 7/1995 | DeAngelis et al. . |
| 5,658,506 | 8/1997 | White et al. . |
| 5,733,497 | 3/1998 | McAlea et al. . |
| 5,817,206 | 10/1998 | McAlea et al. . |
| 5,967,218 * | 10/1999 | Pergande et al. .................. 164/46 |

\* cited by examiner

*Primary Examiner*—Tom Dunn
*Assistant Examiner*—Len Tran
(74) *Attorney, Agent, or Firm*—Larry I. Shelton

(57) ABSTRACT

A method of making a spray formed rapid tool includes the steps of making a model of a desired tool and directly constructing a sand pattern as the inverse of the model. The method also includes the steps of thermally spraying metal material against the sand pattern to form the desired tool.

16 Claims, 2 Drawing Sheets

METHOD OF MAKING A SPRAY FORMED RAPID TOOL

BACKGROUND OF THE INVENTION

1. Field of the Invention

The present invention relates generally to spray formed rapid tools and, more specifically, to a method of making a spray formed rapid tool

2. Description of the Related Art

It is known to make a spray formed rapid tool. In spray forming, a master model of a desired tool is produced using a free form fabrication technique. This master model is then used to create a ceramic pattern which is the reverse of the desired tool to be produced. A ceramic slurry, typically alumina, is poured onto the master model and solidified to form the ceramic pattern. When solidification is complete, the resulting ceramic pattern is put through a series of heat cycles and becomes the receptor onto which metal is sprayed to form a deposit in the shape of the desired tool.

Typically, the spray forming process uses a wire-arc spraying. In wire-arc spraying, electric current is carried by two electrically conductive, consumable wires with an electric arc forming between the wire tips. A high-velocity gas jet blowing from behind the consumable wires strips away the molten metal, which continuously forms as the wires are melted by the electric arc. The high-velocity gas jet breaks up or atomizes the molten metal into finer particles in order to create a fine distribution of molten metal droplets. The atomizing gas then accelerates the droplets away from the wire tips to the ceramic pattern where the molten metal droplets impact the ceramic pattern to incrementally form a deposit in the shape of the desired tool.

The desired tool is then removed from the ceramic pattern. The removal is typically accomplished by cutting off the perimeter of the deposit which a high pressure waterjet, chiseling off the majority of the alumina forming the ceramic pattern and then using a glass bead blaster to remove the residual alumina from the surface of the desired tool. The completed desired tool is then mounted and used to produce parts in conventional stamping, die casting, or molding process.

Although the above process for making a spray formed rapid tool has worked well, it suffers from the disadvantage that it takes a considerable amount of time to remove the ceramic pattern from the thermally sprayed tool. Another disadvantage of the above process is that the ceramic pattern cannot be produced directly from the master model. As a result, the process of making the spray formed rapid tool is relatively time consuming and costly. Therefore, there is a need in the art to produce patterns for a spray formed rapid tool that is less time consuming and costly.

SUMMARY OF THE INVENTION

Accordingly, the present invention is a method of making a spray formed rapid tool. The method includes the steps of making a model of a desired tool and directly constructing a sand pattern as the inverse of the model. The method also includes the steps of thermally spraying a metal material against the sand pattern to form the desired tool.

One advantage of the present invention is that a method is provided of making a spray formed rapid tool that is less time consuming and costly. Another advantage of the present invention is that the method uses rapid prototyping and selective laser sintering to directly produce sand patterns for a spray formed rapid tool and shortens product development cycle time. Yet another advantage of the present invention is that the method uses selective laser sintering to create sand patterns and decrease the time and cost of producing spray form tooling. Still another advantage of the present invention is that the method reduces the time required to produce spray formed tools by approximately sixty-seven percent and cost by approximately forty-seven percent by using selective laser sintering sand patterns as compared to ceramic patterns.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1A:
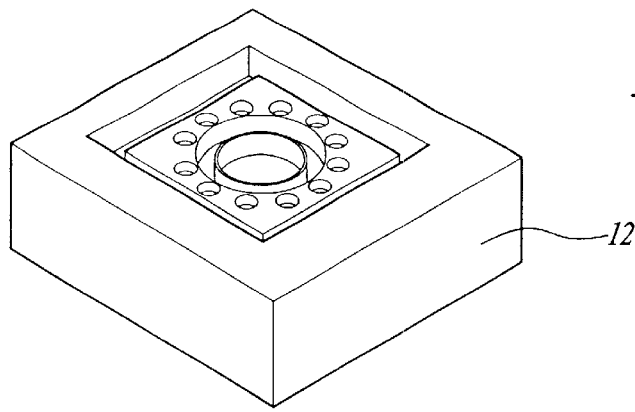
FIGS. 1A, 1B, 1C, 1D and 1E are a schematic flow diagram of a method of making a spray formed rapid tool according to the present invention.
Figure 1B:
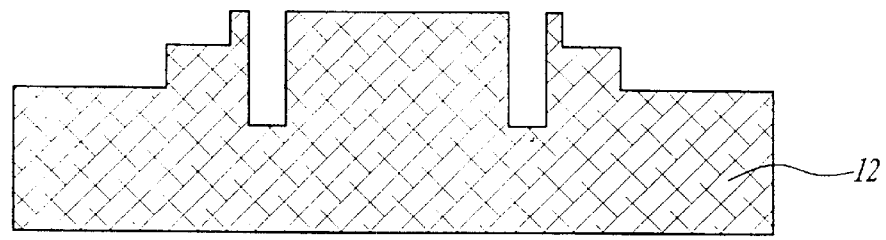

Referring to the drawings and in particular FIGS. 1A through 1E, one embodiment of a method of making a spray formed rapid tool, according to the present invention, is shown. The method begins by creating or making a master model 12 of a desired tool as illustrated in FIGS. 1A and 1B. The master model 12 is a CAD/CAM design. Such a process is disclosed in U.S. Pat. No. 5,658,506 to White et al., the disclosure of which is hereby incorporated by reference.

Figure 1C:
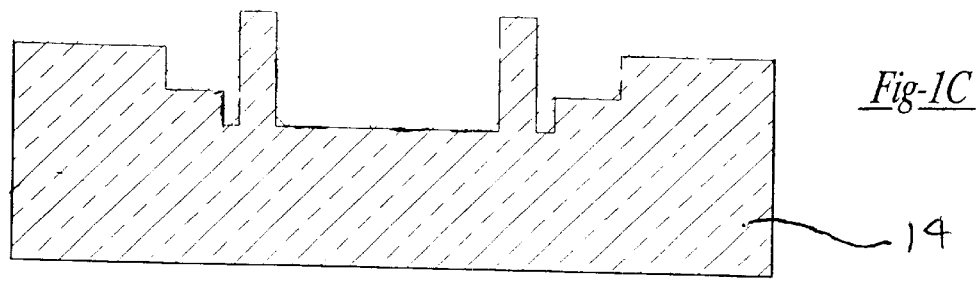

The method also includes the step of making a sand pattern 14 as the inverse of the master model 12 as illustrated in FIG. 1C. The sand pattern 14 is a CAD/CAM design. The method includes the step of constructing the sand pattern 14 from the CAD/CAM design. To construct the sand pattern 14, a selective laser sintering (SLS) process is used. The SLS process creates solid, three-dimensional objects by fusing powdered materials with a $CO_2$ laser. In the SLS process, CAD data for the sand pattern 14 is outputted to the $CO_2$ laser, which is disposed in a process chamber (not shown). As the SLS process begins, a layer of heat-fusible powder is deposited across a part-build chamber (not shown). The heat-fusible powder is a thermoset resin coated sand which can be zircon (Zr II) or silicon (Si) foundry sand which is commercially available under the trademark Sandform™ from DTM Corporation of Austin, Texas. An initial cross-section of the object under fabrication is selectively "drawn" on the layer of powder by a heat generating $CO_2$ laser (not shown). The interaction of the laser beam with the powder elevates its temperature to the point of melting, fusing the powder particles and forming a solid mass for the sand pattern 14. The energy of the laser beam is modulated to melt the powder only in areas defined by the object's geometry at that cross section. An additional layer of powder is deposited via a roller mechanism (not shown) on top of the previously scanned layer. The process is repeated, with each layer fusing to the layer below it. Successive layers of powder are deposited and the process is repeated until the sand pattern 14 is complete. The sand pattern 14 is removed from the build chamber and the loose powder is removed for reuse. It should be appreciated that the SLS process is conventional and known in the art. It should also be appreciated that the SLS process and process chamber is commercially available from the DTM Corporation.

Figure 1D:
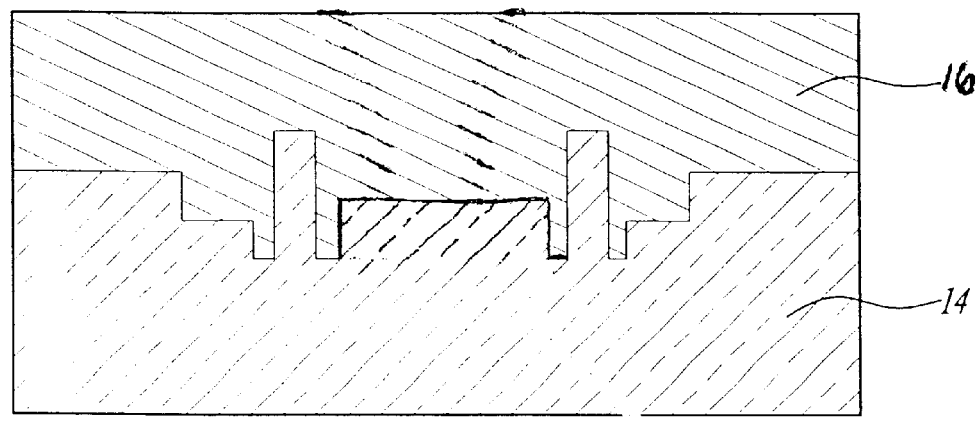
Figure 1E:
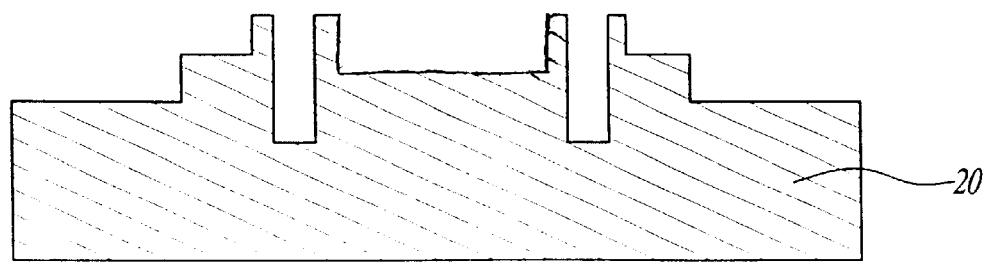

The method includes the step of curing the sand pattern 14. The sand pattern is cured in an oven (not shown) at a predetermined temperature such as 160° C. for a predetermined time period such as approximately twelve hours. As illustrated in FIG. 1D, the method includes the step of thermally spraying a metal material against the sand pattern 14 to form a spray formed rapid tool 16 as the desired tool. Such step is desirably carried out by the wire arc process previously described. Another method to carry out the step of thermally spraying is the osprey process wherein a semi-solid slurry of hardenable metal material is sprayed from an induction heated nozzle supply and is impelled against the sand pattern 14 with a high velocity due to the high pressure gases that atomize the molten fluid. Metal droplets are formed from a melt that is atomized by gas (not from wire or powder). Continuous spraying is carried out to build up a layer that exceeds at least one-eighth (⅛) inch in thickness, at its thinnest section. As the spray is applied and built up, the spray formed tool 16 is formed as illustrated in FIGS. 1D and 1E.

Metals usable for this purpose include metals such as zinc and high temperature high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

The density of the sprayed metal in accordance with this invention, will vary depending on the spray process used, but is generally between 95–99.5%. If the spray formed rapid tool 16 is made by the osprey process, the density will be 99.5% and if it is made by an arc spraying process such as twin arc, the density will be about 95%. The osprey process provides virtually no porosity in the as deposited metal because of the use of a semi-solid slurry that constantly feeds the solidifying metal material. The spraying process will result in little or no shrinkage because of such continuous feeding of deposited material. The osprey spraying process results in a finer microstructure.

Once the spray formed rapid tool 16 is formed, the sand pattern 14 is removed from the spray formed rapid tool 16. The perimeter of the spray formed rapid tool 16 is cut-off with a high pressure water-jet (not shown). The sand pattern 16 is removed by chiseling off the majority of the sand and then using a glass bead blaster (not shown) to remove residual sand from the surface of the spray formed rapid tool 16. The blasting pressure of the glass bead blaster is approximately twenty psi. to remove the sand and takes only minutes. It should be appreciated that the lower blasting pressure aids in retaining a deposit of delicate features and sharp corners in the spray formed rapid tool 16. It should also be appreciated that the sand pattern 14 is easy to chisel and erodes readily with the glass bead media.

Alternatively, the sand pattern 14 may be removed by burning off a thermoset resin that holds the sand pattern 14 together. The thermoset resin begins to degrade upon heating above 220° C., allowing the loose sand to be easily removed. This can be done in a separate heat cycle or if the spray formed rapid tool 16 needs to be normalized, the two processes for removing the sand pattern 14 can be done simultaneously to conserve time. It should be appreciated that this non-abrasive sand removal process will allow delicate features and sharp corners of the spray formed rapid tool to remain intact. The completed spray formed rapid tool 16 may then be used in a die-set mold mounted in an injection molding machine (not shown) and used to produce molded parts.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making a spray formed rapid tool comprising the steps of:

making a model of a desired tool;

directly constructing a sand pattern as the inverse of the model; and thermally spraying a metal material against the sand pattern to form a desired tool.

2. A method as set forth in claim 1 wherein said step of making a model comprises making a model in the form of CAD data.

3. A method as set forth in claim 1 wherein said step of directly constructing the sand pattern comprises making a sand pattern as an inverse of model in the form of CAD data and using selective laser sintering to construct the sand pattern from the CAD data.

4. A method as set forth in claim 1 including the step of providing a thermoset resin sand prior to said step of directly constructing.

5. A method as set forth in claim 1 including the step of separating the sand pattern from the desired tool.

6. A method as set forth in claim 5 wherein said step of separating comprises chiseling off a majority of the sand pattern and using a glass bead blaster to remove residual sand pattern from the spray formed rapid tool.

7. A method as set forth in claim 5 wherein said step of separating comprises burning off a thermoset resin that holds the sand pattern together.

8. A method of making a spray formed rapid tool comprising the steps of:

making a CAD model of a desired tool;

directly constructing a sand pattern by selective laser sintering as the inverse of the CAD model;

thermally spraying a metal material against the sand pattern to form a desired tool; and separating the sand pattern from the desired tool.

9. A method as set forth in claim 8 wherein said step of separating comprises burning off a thermoset resin that holds the sand pattern together.

10. A method as set forth in claim 8 wherein said step of separating comprises chiseling off a majority of the sand pattern and using a glass bead blaster to remove residual sand pattern from the spray formed rapid tool.

11. A method as set forth in claim 8 including the step of providing a thermoset resin sand prior to said step of directly constructing.

12. A method as set forth in claim 11 wherein said step of directly constructing the sand pattern comprises making a sand pattern as an inverse of model in the form of CAD data and using selective laser sintering to construct the sand pattern from the CAD data.

13. A method of making a spray formed rapid tool comprising the steps of:

making a CAD model of a desired tool;

making a sand pattern as an inverse of the CAD model in the form of CAD data;

providing a thermoset resin sand;

constructing the sand pattern using selective laser sintering from the CAD data to fuse the thermoset resin sand together;

thermally spraying a metal material against the sand pattern to form a desired tool.

14. A method as set forth in claim 13 including the step of separating the sand pattern from the desired tool.

15. A method as set forth in claim 14 wherein said step of separating comprises chiseling off a majority of the sand pattern and using a glass bead blaster to remove residual sand pattern from the spray formed rapid tool.

16. A method as set forth in claim 14 wherein said step of separating comprises burning off the thermoset resin that holds the sand pattern together.

* * * * *